June 5, 1962 H. W. LARSEN 3,037,573
SHAFT VIBRATION DAMPENING
Filed Sept. 26, 1958 4 Sheets-Sheet 1

INVENTOR.
Hugh W. Larsen
BY
Robert D. Gerhardt
ATTORNEY

June 5, 1962 H. W. LARSEN 3,037,573
SHAFT VIBRATION DAMPENING
Filed Sept. 26, 1958 4 Sheets-Sheet 2

INVENTOR.
Hugh W. Larsen
BY
Robert B. Gerhardt
ATTORNEY

June 5, 1962 H. W. LARSEN 3,037,573
SHAFT VIBRATION DAMPENING
Filed Sept. 26, 1958 4 Sheets-Sheet 3
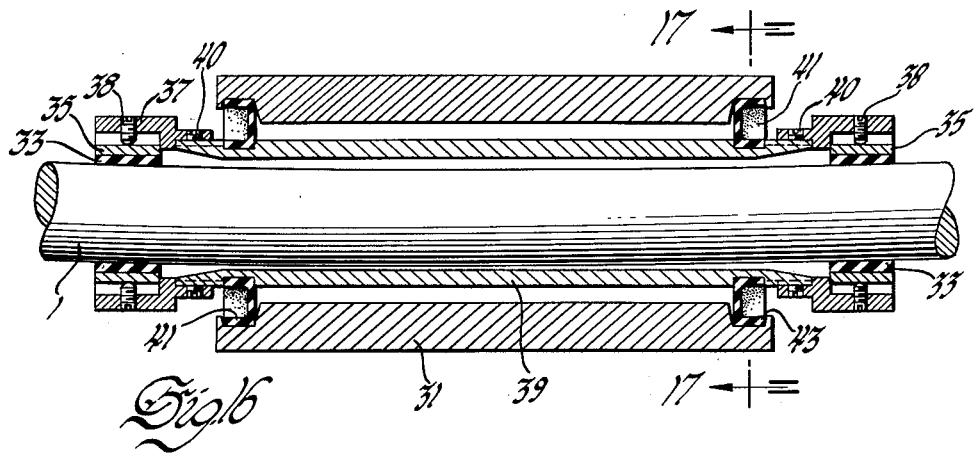
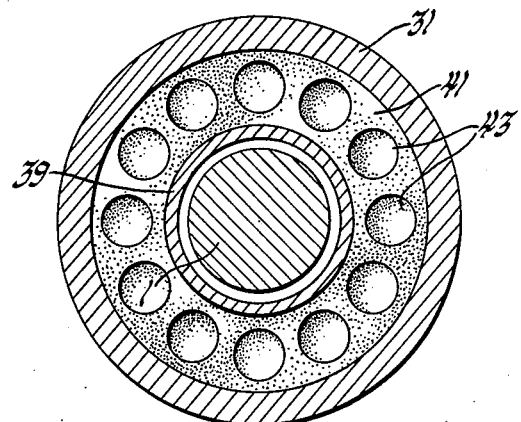
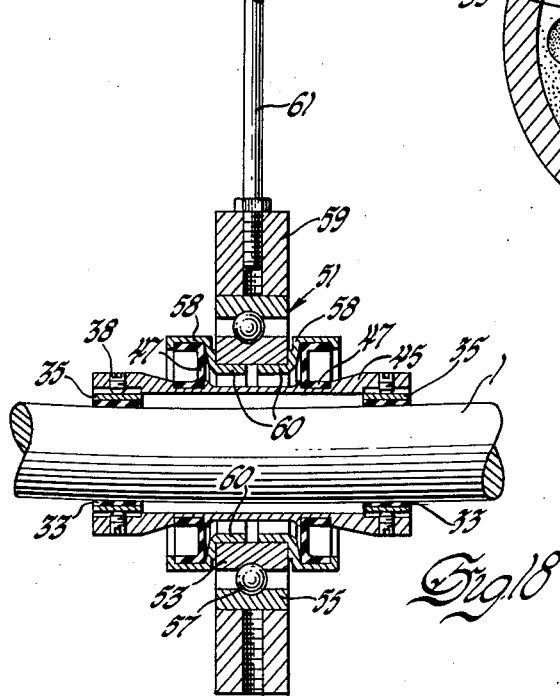
INVENTOR.
Hugh W. Larsen
BY
Robert B. Gerhardt
ATTORNEY June 5, 1962
H. W. LARSEN
3,037,573
SHAFT VIBRATION DAMPENING
Filed Sept. 26, 1958
4 Sheets-Sheet 4
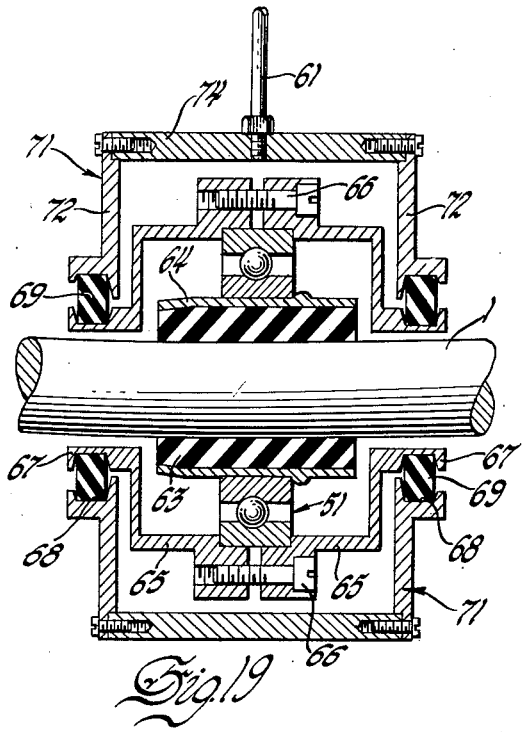
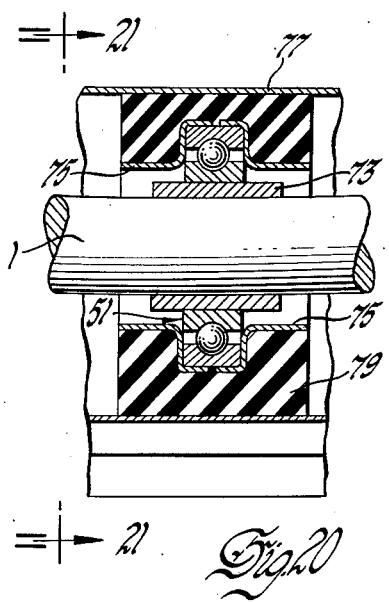
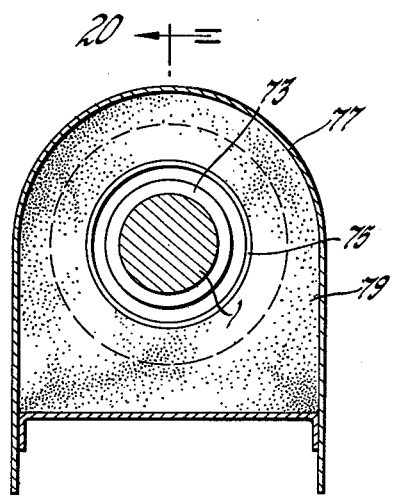
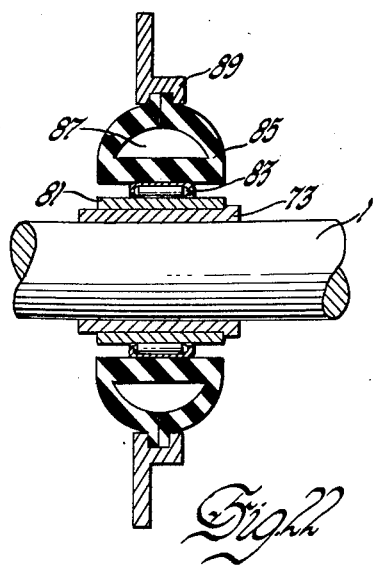
INVENTOR.
Hugh W. Larsen
BY
Robert B. Gerhardt
ATTORNEY

United States Patent Office 3,037,573
Patented June 5, 1962

3,037,573
SHAFT VIBRATION DAMPENING
Hugh W. Larsen, Milford, Mich., assignor to General Motors Corporation, Detroit, Mich., a corporation of Delaware
Filed Sept. 26, 1958, Ser. No. 763,566
12 Claims. (Cl. 180—70)

This invention relates to vibration dampers and more particularly to vibration control means for torsion bar power shafts.

Where relatively long shafts are used to transmit power between two devices as, for example, between an engine of a motor vehicle and the rear axle thereof, such shafts are normally designed so that they are relatively stiff and have a critical speed above their maximum operating speed. In such installations when the shafts are very long there sometimes occur bending vibrations in the shaft; these vibrations usually occur at shaft speeds corresponding to sub-harmonics of the first mode natural frequency of the shaft. Where these vibrations occur they are generally controlled by a center bearing connected to the center of the shaft to minimize the amplitude of vibration of the shaft. These bearings are sometimes referred to as steady rest bearings.

If a relatively small diameter curved torsion bar shaft of the type shown and described in copending application S.N. 676,094, entitled "Power Shaft," filed August 5, 1957, in the name of John Z. De Lorean, and assigned to the assignee of the instant application and which has since become abandoned is used, the shaft can operate at speeds equal to and greater than the so-called critical speed or lowest natural frequency of a conventional non-curved shaft. By utilizing the invention set forth in the aforementioned power shaft application, the critical speed or lowest natural frequency vibrations can be controlled by curving the shaft into a stressed shape. As set forth in the aforementioned copending application, when the shaft is bent into a stressed curved shape, the critical speed of the shaft is increased. This is true of the first mode or lowest natural frequency which is commonly called the critical speed. With the first mode frequency vibration under control, it is possible to operate the curved shaft at higher speeds, which may include the speed corresponding to second mode natural frequency for a corresponding straight shaft or at least major sub-harmonics thereof. Because the second mode bending frequency of a beam or bar is a non-extensional form of vibration, that is, the beam or bar may vibrate in the second mode without extending or changing its length, curving the bar does not have any appreciable effect on the second mode natural frequency.

Since curving a shaft and holding it in a predetermined stressed condition allows the shaft to be operated at speeds corresponding to the second mode natural frequency for a corresponding straight shaft, it is desirable that some means for controlling bending vibrations in the shaft be used to improve the operation of the shaft. Since the shape of the second mode vibration is such that the bar or shaft does not vibrate at its center as is the case with respect to the first mentioned vibration, the conventional centrally placed bearing will have no effect on second mode vibration.

There are many different types of vibrational control means, but the most desirable one will limit the amplitude of vibration to a small amount and, hence, maintain the vibrational force at a very low level. At the same time, the best vibration control will be one that will not transmit objectionable vibration forces to other members such as the frame and body of a motor vehicle. The vibration control should also not change the operating characteristics of the shaft.

It is therefore an object of the invention to provide vibration control means for a power shaft adapted to be operated at high speeds.

It is a further object of the invention to provide effective vibrational control means for second mode vibrations occurring in curved torsion bar power shafts.

These and other objects and advantages will be readily apparent to those skilled in the art from the following description and drawings in which:

FIGURE 16 is a sectional view of an actual vibration dampener of the type shown schematically in FIGURES 6 and 7;

FIGURE 17 is a sectional view taken on the line 17—17 of FIGURE 16;

FIGURE 18 is another cross-sectional view of another actual vibration controller of the type shown schematically in FIGURES 8 and 9;

FIGURE 19 is a cross-sectional view of still another actual device of the type represented schematically in FIGURES 8 and 9;

FIGURE 20 is a cross-sectional view of an actual construction of the type of device shown schematically in FIGURES 12 and 13;

FIGURE 21 is a sectional view taken on the line 21—21 of FIGURE 20; and

FIGURE 22 is a cross-sectional of another form of vibration control member of the type shown schematically in FIGURES 12 and 13.

Figure 1:
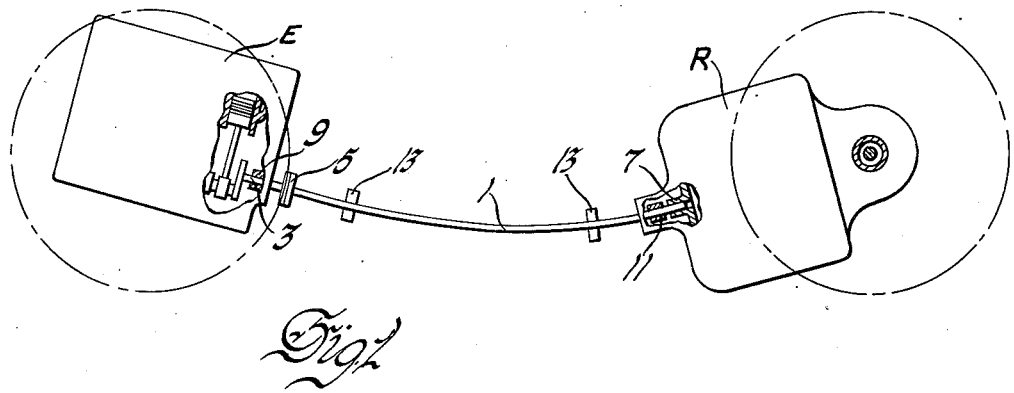
FIGURE 1 is a diagrammatic view of the motor vehicle employing the invention.

Referring to the figures, and particularly FIGURE 1, the invention is shown schematically in a motor vehicle installation. An inclined engine E is connected by a curved torsion bar shaft to an inclined rear axle R, which may or may not include a speed change transmission as well as a differential mechanism. The shaft 1 can be connected to the engine crankshaft 3 by any suitable means, such as flange member 5, shown in FIGURE 1. The other end of the shaft 1 is connected to transmit torque to an input shaft 7 of the rear axle R by any suitable means, FIGURE 1 showing a spline connection.

The shaft 1, which is straight prior to installation in the vehicle, is held in a stressed curved shape by the rear engine bearing 9 acting through flange 5 on crankshaft 3 and by a bearing member 11 in the rear axle. The flange 5, in combination with the bearing 9 and the bearing 11, places a bending moment on the shaft 1, and if the shape of the shaft 1 as held by the bearings is that of a circular arc, the bending moment will be uniform throughout the length of the shaft. Reference is made to the above mentioned application S.N. 676,094 for further details on the bending moments and stresses on the shaft 1. Means other than the flange and bearings may be used to hold the shaft in its predetermined shape. A pair of vibration control members generally indicated at 13 surround the shaft at predetermined points. Depending on the type of vibration control means utilized, the control members 13 may or may not contact other elements of the motor vehicle, such as the body, frame, or other components of the vehicle.

Figure 2:
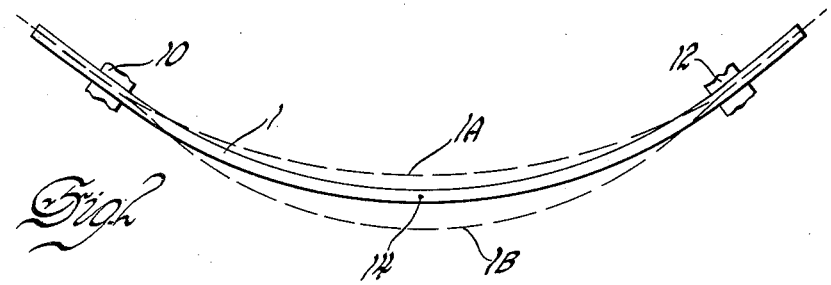
FIGURE 2 is a diagrammatic view showing first mode vibration in a curved torsion shaft.

FIGURE 2 diagrammatically shows a curved shaft being held in a curved position by shaft support bearings 10 and 12, with the bearings 10 and 12 schematically representing the supports that hold the shaft in the predetermined curved position. These supports could be flanges like flange 5, bearings, etc. The dashed lines 1A and 1B indicate extreme positions of the shaft 1 when vibrating at what is commonly referred to as the first critical speed which is actually the lowest or first mode natural bending frequency of the shaft. It is to be noted that the shape of the vibrational mode is such that maximum amplitude of vibration occurs at the center point 14 of the shaft. The form of vibration shown in FIGURE 2 is the type of vibration usually associated with long rotating power shafts and, as mentioned above, is normally controlled by steady rest bearings located at the center of the shaft.

It should be noted that when the shaft is held in a stressed curve shape, such as that shown in the figures, the natural frequency of vibration for the first mode is higher than that of a corresponding non-curved straight shaft. The difference in frequency between the shaft in its straight and curved conditions becomes greater as the shaft is curved more and more.

Figure 3:
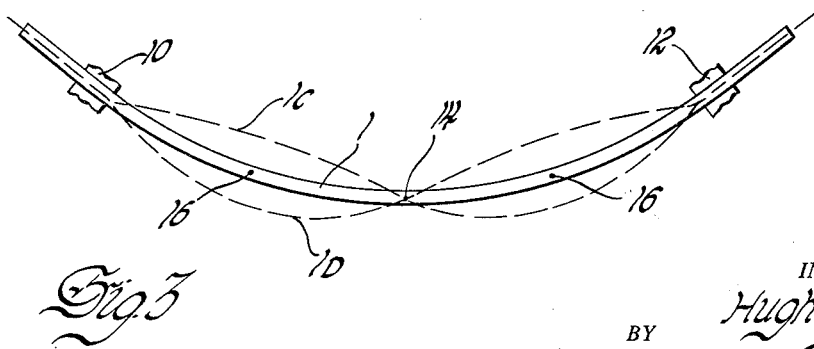
FIGURE 3 is a diagrammatic view showing the second mode vibration of a curved torsion shaft.

It has been found that curving the shaft more than a predetermined amount will raise the natural bending frequency of the shaft in the plane of the curvature above the second mode natural frequency which is diagrammatically illustrated in FIGURE 3. As indicated above, in conventional installations, the second mode frequency does not usually present any problem since the second mode frequency of a straight shaft is normally about three times that of the first mode frequency. As mentioned, FIGURE 3 illustrates a curved shaft 1 held in a predetermined shape by schematically illustrated supports 10 and 12. The dashed lines 1C and 1D indicate extreme positions of the shaft when vibrating at the second mode frequency. It has been found that curving the shaft does not appreciably change the frequency of second mode and, therefore, the second mode vibration of FIGURE 3 may occur at shaft rotational speeds less than those causing the first mode vibration shown in FIGURE 2. Note that the second mode vibration of FIGURE 3 has a node in the center of the shaft indicated by 14. The shaft has zero deflection or amplitude of vibration at the center and, therefore, any steady bearing placed at the center of the shaft will be ineffective in controlling second mode vibration.

Figure 4:
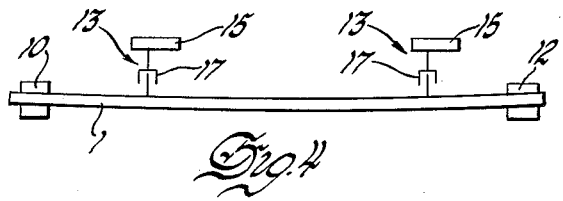
FIGURE 4 is a schematic view of one type of vibration absorber.
Figure 5:
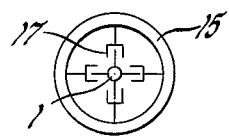
FIGURE 5 is an end view of the device shown in FIGURE 4.

To control the second mode of vibration of the type shown in FIGURE 3, there are a number of different structures that can be employed. FIGURES 4 through 15 schematically illustrate six different vibration control means that can be utilized. The first three devices, shown in FIGURES 4 through 9, are seismic vibration absorbers whereas the last three, shown in FIGURES 10 through 15, are of the grounded type. Referring to FIGURES 4 and 5, there are a pair of control members 13, each of which includes a seismic mass 15 surrounding the shaft 1 and connected to the shaft through a dashpot means indicated schematically by 17. The vibration control members 13 may be located at a number of positions; however, they should be located in the vicinity of maximum vibration amplitude of the second mode frequency, which maximum amplitude occurs at approximately the ¼ points 16 on the shaft. At the quarter points the vibration control members will have the greatest influence on the second mode vibration. However, in some installations it may be advantageous to utilize the vibration control members to also control the first mode vibration which has a maximum amplitude at the center of the shaft. It should be noted that the natural frequency of the curved shaft in the plane normal to the direction of curvature is not appreciably affected by the curvature. Therefore, there will be some vibration of the shaft in that direction when the shaft is rotating at a speed corresponding to the natural frequency of a same size curved shaft. Since this vibration is not self-exciting, it is easy to control. By moving the position of the vibration control members from the quarter points towards the center of the shaft, the effect of the vibration damper on the first mode vibration will be increased while the effect on the second mode vibration will be decreased. The best position for location of the control members will vary from installation to installation and such location can easily be determined experimentally.

Referring again to FIGURES 4 and 5, movement of the shaft 1 from its normal position into either the first or second mode shapes can occur only through action of the dashpot 17. The dashpots 17 may be conventional dashpots, but may instead be any equivalent vibration energy dissipating devices, such as viscous dampers, friction dampers, butyl, rubber or other equivalent devices having internal energy dissipating capacity. Since the vibrational energy on the shaft 1 is dissipated in the dashpot or dampener means 17, whose movement is resisted by the seismic mass 15, the amplitude of vibration of the shaft 1 will be minimized since the vibrational energy cannot build up within the shaft 1 but is dissipated in the dashpot 17.

Figure 6:
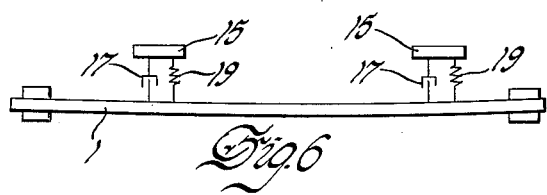
FIGURE 6 is another form of vibration control.
Figure 7:
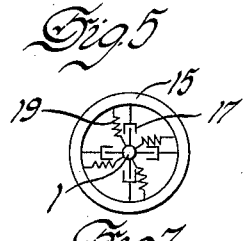
FIGURE 7 is an end view of the device of FIGURE 6.
Figure 8:
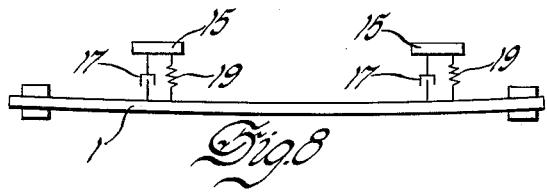
FIGURE 8 is still another form of vibration control.
Figure 9:
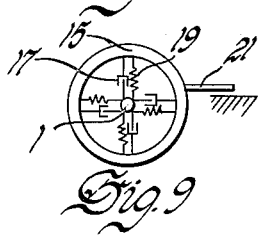
FIGURE 9 is an end view of FIGURE 8.

Whereas FIGURES 4 and 5 schematically illustrate a form of vibrational control of the damper type which utilize an energy dissipating or damping device, FIGURES 6 and 7 schematically illustrates a seismic vibration absorber that utilizes a combination damper and spring. A seismic mass 15 again surrounds the shaft 1 and is connected to the shaft through a dashpot or equivalent energy dissipating device 17 and a spring member 19. In an actual device the dashpot 17 and spring member 19 may be the same member such as where members formed of certain rubbers, such as butyl, are used between the mass 15 and the shaft 1. In the device shown in FIGURES 6 and 7, only a portion of the vibrational energy is dissipated in the dashpot 17 and the remainder of the vibrational energy is stored in the spring 19 to be returned to the shaft during a subsequent portion of the cycle of vibration. In the two devices shown in FIGURES 4 through 7, the seismic mass 15 is allowed to rotate with the shaft 1 with the resulting advantage of no physical connection between the shaft and other portions of the power installation such as the motor vehicle. Without physical connection the vibrational forces cannot be transmitted to the vehicle and, therefore, cannot be felt by occupants thereof. The rotating mass type of vibration damper shown in FIGURES 4 to 7 operates very well at low shaft speeds. Where a rotating mass vibration dampener is used on a shaft driven at very high speeds the mass itself can become unbalanced and after overcoming the spring force of the vibration absorber the mass will tend to fly out to one side of the shaft. This would result in an unbalanced condition which would be undesirable. FIGURES 8 and 9 illustrate a form of vibration control similar to that in FIGURES 6 and 7 except that in the embodiment of FIGURES 8 and 9 the seismic mass 15 is held against rotation by a stop rod 21 that engages some stationary member of the vehicle. In such a construction some provision for relative rotational movement between the shaft 1 and mass 15 must be made. This may be in the form of bearings or other antifriction elements located between the shaft and the dashpot 17 and springs 19 or between the dashpot 17, springs 19 and the seismic mass 15.

Figure 10:
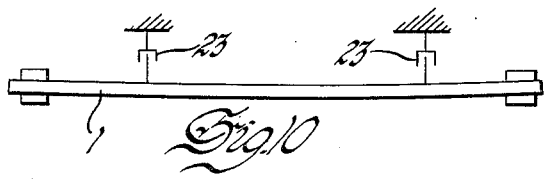
FIGURE 10 is still another form of vibration control.
Figure 11:
FIGURE 11 is an end view of FIGURE 10.

In addition to using seismic mass types of vibration absorbers, shaft vibration can also be controlled by vibration dampeners connected to mass elements that are part of the vehicle itself, that is some non-rotating member of the motor vehicle, such as the body, frame, engine, etc. FIGURES 10 and 11 schematically show such a device that employs dashpots 23 connecting the shaft with the ground member. As in the case of the construction of FIGURES 4 and 5, vibrational energy is dissipated in the dashpots 23 and, hence, cannot build up in the shaft 1. As in the devices shown in FIGURES 4 through 9, the dashpot 23 may be any equivalent device which has internal dissipation of energy. By proper selection of the damping characteristics of the dashpots, the amount of vibrational force transmitted to the ground member, such as the vehicle frame, will be kept at a minimum.

Figure 12:
FIGURE 12 is still another form of vibration control.
Figure 13:
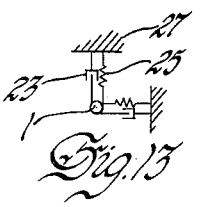
FIGURE 13 is an end view of FIGURE 12.

FIGURES 12 and 13 schematically show another form of vibration control that utilizes springs 25 in parallel with dashpots 23, that together connect the shaft to ground member 27. In this case only a portion of the energy is dissipated in the dashpots 23 while the remainder is stored in the springs 25.

Figure 14:
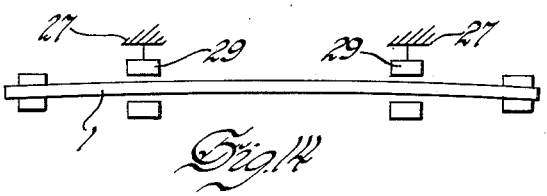
FIGURE 14 is still another form of vibration control.
Figure 15:
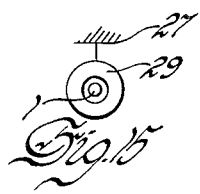
FIGURE 15 is an end view of FIGURE 14.

FIGURES 14 and 15 illustrate another form of vibration damper which includes a pair of permanent magnets or electromagnets schematically represented as 29 which are connected to ground member 27. Movement of the shaft 1 from its normal position into the shape of the first or second modes is resisted by the magnetic forces from the magnets 29. This construction has the advantage that there is no physical connection between the shaft and the vibration dampener itself.

FIGURES 16 through 22 illustrate five different actual constructions that have been utilized to control the second and first mode vibrations in the rotating shaft. The first construction shown in FIGURES 16 and 17 is equivalent to that shown schematically in FIGURES 6 and 7 and includes rubber shims 33 surrounding the shaft 1, a split metal ring 35 surrounding the shims 33 and a pair of attaching rings 37 which are secured to the split rings 35 by means of set screws 38. An absorber support sleeve 39 is secured to the attaching ring 37 by means of set screws 40. A pair of butyl rubber rings 41 which acts as a combination vibration absorber and spring are fitted between the support sleeve 39 and a cylindrical seismic mass 31. The rubber rings 41 are formed with holes 43 as seen in FIGURE 17 and the shape and size of the rings 41 are predetermined so as to provide the desired damping and spring characteristics. The seismic mass vibration absorber shown in FIGURES 16 and 17 operates like that schematically shown in FIGURES 6 and 7.

FIGURE 18 illustrates an actual vibration absorbing device of the type shown schematically in FIGURES 8 and 9, and includes a support sleeve 45 mounted on the shaft 1 by means of rubber shims 33, split rings 35 and set screws 38 similar to the manner in which the attaching rings 37 are mounted on the shaft 1 in the vibration absorber of FIGURES 16 and 17. The seismic mass 59 surrounds the whole assembly and is connected to the support sleeve 45 by means of the ball bearing generally indicated 51 and which includes an inner race 53, an outer race 55 and balls 57. A pair of rubber rings 47 formed of butyl or equivalent material encompass the supporting sleeve 45 and are themselves surrounded and held in place by a pair of attaching rings 58 having flanged portions 60 that receive the inner race 53 of the ball bearing 51. The vibration absorber shown in FIGURE 18 operates like that shown schematically in FIGURES 8 and 9.

Referring now to FIGURE 19, another device representative of the type shown schematically in FIGURES 8 and 9 is shown. In this case the relative rotation between the shaft 1 and the seismic mass is taken at an antifriction bearing located between the shaft and the vibration damper rather than between the vibration dampening member and the mass as in the previous embodiment shown in FIGURE 18. In this construction a rubber sleeve 63 is fitted on the shaft 1, the sleeve 63 being surrounded by a metal retainer sleeve 64 upon which a ball bearing, generally indicated 51, is secured. A pair of annular stepped support rings 65 surround the ball bearing 51 and are secured together by means of bolts 66. These support rings 65 have grooves 68 formed in their extreme flanges 67 that receive vibration dampening rings 69 formed of butyl or other suitable material. The rings 69 carry the seismic mass 71 which includes a pair of annular end plates 72 and a cylinder member 74. A stop rod 61 is attached to the mass 71 and is adapted to engage the ground member on the vehicle to prevent rotation of the mass 71. As before, the damper rings 69 are designed to provide the desired vibration dampening and spring effect.

FIGURES 20 and 21 illustrate an actual construction of a vibration absorber of the type schematically shown in FIGURES 12 and 13. A shim member 73 surrounds the shaft 1. The shim 73 may be pressed on the shaft, glued thereto, or secured by any suitable means. A ball bearing generally indicated 51 surrounds the shim 73 and a pair of retainer rings 75 surround the ball bearing 51. A rubber damper member is forced over the retainer ring 75 and is enclosed by a U-shaped combination support and retainer member 77. The damper member 79 is formed of any suitable material and is designed so as to have the proper damping and spring characteristics.

Another illustration of an actual construction of the type shown schematically in FIGURES 12 and 13 is shown in FIGURE 22. In this construction, a shim 73 is secured by any suitable means to the shaft 1. A metal ring 81 surrounds the shim 73 and forms the inner race for a needle roller bearing 83. The outer race of the needle roller bearing 83 is surrounded by a folded rubber ring 85 forming an annular chamber 87 that is filled with silicon fluid or other suitable viscous medium. An outer ring 89 serves to seal the ring 85 and to support the same with the ring 89 secured to some stationary member of the vehicle. The silicon fluid provides additional damping to that provided by the rubber in that vibrational energy is dissipated within the fluid.

It will be seen that use of the invention will allow operation of relatively long power transmission shafts at rotational speeds considerably above those considered conventional. It will further be seen that the invention may be applied to various types of installations and that other embodiments and arrangements will be readily apparent to those skilled in the art without departing from the invention which is to be limited only by the following claims.

What is claimed is:

1. In a motor vehicle having a non-coaxial engine and rotating load, a stressed curved shaft connecting said engine to said load, said shaft driven by said engine at a speed greater than the first critical speed of said shaft when straight, said curved shaft having a predetermined second mode critical speed, and vibration dampening means for said shaft axially spaced from and located between each end and the midpoint of said shaft, said dampening means adapted to control bending vibrations in said shaft when operating at said second critical speed or a subharmonic thereof.

2. In a motor vehicle having an engine and a rotating load, a stressed curved shaft connecting between the engine and load, said shaft having a predetermined second mode natural frequency of bending vibration, and a plurality of vibration absorbers connected to said shaft at predetermined points along said shaft for limiting the amplitude of vibration of said shaft when operating at speeds corresponding to said second mode natural frequency or sub-harmonics thereof at least one of said vibration absorbers being located substantially remote from and between the midpoint and each end of said shaft.

3. In a motor vehicle having an engine and a rotating load having different axis of rotation than the engine, a stressed curved shaft arranged to connect the engine and load, said shaft having a predetermined second mode natural frequency of bending vibration, a plurality of vibration absorbers connected to said shaft at predetermined points along the length of said shaft for limiting the amplitude of vibration of said shaft when operating at speeds corresponding to said second mode natural frequency or sub-harmonics thereof, said vibration absorbers comprising seismic masses connected to said shaft through vibrational energy dissipating means said masses connected to said shaft at points substantially remote from the midpoint and the ends of said shaft, at least one of said masses located on each side of said midpoint.

4. In a motor vehicle having an engine and a rotating load having a different axis of rotation than the engine, a stressed curved shaft for connecting the engine and load, said shaft having a predetermined second mode natural frequency of bending vibration, a plurality of vibration absorbers connected to said shaft at predetermined points along the length of said shaft for limiting the amplitude of vibration of said shaft when operating at speeds corresponding to said second mode natural frequency or sub-harmonics thereof, said vibration absorbers comprising vibrational energy dissipating means connecting said shaft to a stationary member of the vehicle at least one of said energy dissipating means located between the midpoint and each end of said shaft.

5. In a motor vehicle having an engine and a driving axle, a stressed curved shaft connecting between the engine and axle, said shaft having a predetermined second mode natural frequency of bending vibration, and a plurality of vibration absorbers connected to said shaft at predetermined points along said shaft for limiting the amplitude of bending vibration of said shaft when operating at a speed corresponding to said second mode natural frequency or a sub-harmonic thereof, said vibration absorbers comprising seismic masses connected to said shaft at points substantially remote from the midpoint and ends of said shaft, at least one of said absorbers located on each side of said midpoint, said absorbers connected to said shaft through predetermined vibrational energy dissipating means and through spring means having a predetermined spring rate.

6. In a motor vehicle having an engine and a driving axle, a stressed curved shaft connecting between the engine and axle, said shaft having a predetermined second mode natural frequency of bending vibration, a plurality of vibration absorbers connected to said shaft at predetermined points along said shaft for limiting the amplitude of bending vibration of said shaft when operating at a speed corresponding to said second mode natural frequency or a sub-harmonic thereof, said vibration absorbers comprising seismic masses connected to said shaft at points substantially remote from the midpoint and ends of said shaft, at least one of said masses being positioned on each side of said midpoint, said masses connected to said shaft through predetermined vibrational energy dissipating means and through spring means, and means to prevent rotation of said seismic masses relative to said curved shaft.

7. In a motor vehicle having an engine having a crankshaft rotatable on a predetermined axis of rotation and a rear mounted transmission having an input shaft with a predetermined axis of rotation non-collinear with said crankshaft axis, a stressed curved torsion shaft connecting said crankshaft and input shaft, support means for said shaft to hold the ends of the shaft in a relatively clamped position, said torsion shaft having a predetermined second mode natural frequency of bending vibration, and a plurality of vibration dampers for said shaft to control said second mode vibration when said shaft is rotating at a speed corresponding to said second mode natural frequency or a sub-harmonic thereof at least one of said dampers located on each side of the midpoint of said shaft and positioned remotely from both the midpoint and the nearest end of said shaft.

8. In a motor vehicle having an engine having a crankshaft rotatable on a predetermined axis of rotation and a rear mounted transmission having an input shaft having a predetermined axis of rotation non-collinear with said crankshaft axis, a stressed curved torsion shaft connecting said crankshaft and input shaft, said torsion shaft having a predetermined second mode natural frequency of bending vibration, and vibration control means for said shaft to control said second mode vibration when said shaft is rotating at a speed corresponding to said second mode natural frequency or a sub-harmonic thereof, said vibration control means including a plurality of bearings on said shaft at predetermined locations on said shaft and vibration damping means connecting said bearings to a stationary part of the vehicle said bearings located remotely from the midpoint and ends of said shaft, at least one of said bearings located on each side of said midpoint.

9. In a motor vehicle having an engine having a crankshaft rotatable on a predetermined axis of rotation and a rear mounted transmission having an input shaft having a predetermined axis of rotation non-collinear with said crankshaft axis, a stressed curved torsion shaft arranged to connect said crankshaft and input shaft, said torsion shaft having a predetermined second mode natural frequency of bending vibration, and vibration control means for said shaft to control said second mode vibration when said shaft is rotating at a speed corresponding to said second mode natural frequency or a sub-harmonic thereof, said vibration control means including a plurality of bearings fixed on said shaft at predetermined locations remote from the midpoint and ends of said shaft with at least one bearing on each side of the midpoint, and rubber members having predetermined damping and spring characteristics connecting said bearings to a stationary part of the vehicle whereby some of the vibrational energy is stored in said rubber members and some of the energy is dissipated in said rubber members.

10. The motor vehicle of claim 9 in which the butyl rubber members form an annular chamber around said bearings and wherein said chamber is filled with viscous fluid.

11. In a motor vehicle, an engine having a crankshaft rotatable on a predetermined axis of rotation, a rear mounted transmission having an input shaft with an axis of rotation non-collinear with said crankshaft axis, a prestressed curved torsion shaft connecting said crankshaft and said input shaft, said torsion shaft having a predetermined first mode natural bending frequency and a predetermined second mode natural bending frequency, and vibration control members on said shaft placed at predetermined points on said shaft, said control members acting to limit the amplitude of both said first and said second mode vibrations, said vibration control members located remote from the midpoint, the quarter points and the ends of said shaft, at least one of said control members located on each side of said midpoint.

12. In a motor vehicle, an engine having a crankshaft rotatable on a predetermined axis of rotation, a rear mounted transmission having an input shaft with an axis of rotation non-collinear with said crankshaft axis, a prestressed curved torsion shaft connecting said crankshaft and said input shaft, said torsion shaft having a predetermined first mode natural bending frequency and a predetermined second mode natural bending frequency, a pair of vibration control members on said shaft, one of said pair of control members placed between the one quarter and the one third points nearest one end of said shaft and the other of said pair of control members placed between the one quarter and one third points nearest the other end of said shaft, said control members acting to limit the amplitude of both said first and said second mode bending vibrations.

(References on following page)

References Cited in the file of this patent

UNITED STATES PATENTS

| | | |
|---|---|---|
| 1,664,713 | Strickland | Apr. 3, 1928 |
| 1,740,362 | Mader | Dec. 17, 1929 |
| 2,168,108 | Bunau-Varilla | Aug. 1, 1939 |
| 2,214,948 | Youngren | Sept. 17, 1940 |
| 2,897,023 | Burkhalter et al. | July 28, 1959 |
| 2,927,825 | Stone | Mar. 8, 1960 |
| 2,930,660 | Dunn | Mar. 29, 1960 |

OTHER REFERENCES

Text: "Mechanical Vibrations" by J. P. Den Hartog, published in 1956 by McGraw-Hill Book Co., Inc., fourth ed., page 214, filed under TA355, D4, 1956.

Text: "Vibration Problems in Engineering" by S. Timoshenko, published in 1955 by D. Von Nostrand Co., Inc., third ed., pages 290 to 296, filed under TA355, T55, 1955.